United States Patent
Daufeld et al.

(10) Patent No.: US 11,022,480 B2
(45) Date of Patent: Jun. 1, 2021

(54) METHOD FOR CHECKING THE FUNCTIONAL ABILITY OF A RADAR-BASED FILL-LEVEL MEASURING DEVICE

(71) Applicant: Endress+Hauser GmbH+Co. KG, Maulburg (DE)

(72) Inventors: Ghislain Daufeld, Village Neuf (FR); Jens Merle, Schopfheim (DE); Markus Vogel, Schopfheim (DE); Alexey Malinovskiy, Maulburg (DE); Stefan Gorenflo, Hausen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 123 days.

(21) Appl. No.: 15/577,910

(22) PCT Filed: May 23, 2016

(86) PCT No.: PCT/EP2016/061580
§ 371 (c)(1),
(2) Date: Nov. 29, 2017

(87) PCT Pub. No.: WO2016/202531
PCT Pub. Date: Dec. 22, 2016

(65) Prior Publication Data
US 2018/0164145 A1    Jun. 14, 2018

(30) Foreign Application Priority Data
Jun. 15, 2015   (DE) ...................... 10 2015 109 463.0

(51) Int. Cl.
*G01F 23/284* (2006.01)
*G01F 25/00* (2006.01)
(Continued)

(52) U.S. Cl.
CPC ........ *G01F 25/0076* (2013.01); *G01F 23/284* (2013.01); *G01F 25/0061* (2013.01);
(Continued)

(58) Field of Classification Search
CPC . G01F 25/0061; G01F 25/0076; G01F 23/284
See application file for complete search history.

(56) References Cited

U.S. PATENT DOCUMENTS

| 4,044,355 A | 8/1977 | Edvardsson |
| 2011/0161019 A1* | 6/2011 | Mayer ................... G01F 23/284 702/55 |

(Continued)

FOREIGN PATENT DOCUMENTS

| CN | 1 280938 A | 1/2001 |
| CN | 16 32475 A | 6/2005 |

(Continued)

OTHER PUBLICATIONS

German Search Report, German PTO, Munich, dated Mar. 10, 2016.
(Continued)

*Primary Examiner* — Herbert K Roberts
(74) *Attorney, Agent, or Firm* — Bacon & Thomas, PLLC

(57) ABSTRACT

A method for checking the functional ability of an FMCW-based fill-level measuring device, which serves for measuring the fill level of a fill substance located in a container, as well as to a fill-level measuring device suitable for performing this method. For checking the functional ability, a microwave signal is produced, whose frequency change differs from the frequency change of the measurement signal used during regular measurement operation. By comparing the frequency of the difference signal resulting from the microwave signal with a predetermined reference frequency, it is ascertained, whether the fill-level measuring device is functionally able. Thus, the fill-level measuring device (Continued)

detects, independently, whether it is functionally able, or whether an error is present, caused principally by device-internal disturbance signals. This offers, especially, a clear advantage as regards meeting safety standards for the field device.

11 Claims, 3 Drawing Sheets

(51) Int. Cl.
   *G01S 7/40* (2006.01)
   *G01S 13/88* (2006.01)
(52) U.S. Cl.
   CPC ............ *G01S 7/4004* (2013.01); *G01S 13/88* (2013.01); *G01S 7/4056* (2013.01)

(56) References Cited

U.S. PATENT DOCUMENTS

| | | | |
|---|---|---|---|
| 2012/0056774 A1* | 3/2012 | Wennerberg | G01F 23/284 342/124 |
| 2012/0279283 A1 | 11/2012 | Brengartner et al. | |
| 2014/0253366 A1* | 9/2014 | Kleman | G01F 23/0069 342/124 |

FOREIGN PATENT DOCUMENTS

| | | |
|---|---|---|
| CN | 10 2159924 A | 8/2011 |
| DE | 1 9934041 C2 | 3/2001 |
| DE | 11 2006 000 734 T5 | 2/2008 |
| DE | 10 2012 003 373 A1 | 8/2013 |
| DE | 10 2015 109 463 A1 | 12/2016 |
| EP | 1 707 983 A1 | 10/2006 |
| EP | 2 631 612 A2 | 8/2013 |
| JP | H10 307053 A | 11/1998 |
| WO | 2010/034574 A1 | 4/2010 |

OTHER PUBLICATIONS

International Search Report, EPO, The Netherlands, dated Sep. 9, 2016.
Office Action dated May 7, 2019 in corresponding Chinese application No. 201680034478.3.
Office Action dated Jun. 1, 2020 in corresponding Chinese application No. 201680034478.3.

* cited by examiner

METHOD FOR CHECKING THE FUNCTIONAL ABILITY OF A RADAR-BASED FILL-LEVEL MEASURING DEVICE

TECHNICAL FIELD

The invention relates to a method for checking the functional ability of a radar-based fill-level measuring device, which serves for measuring the fill level of a fill substance located in a container, as well as to a fill-level measuring device suitable for performing such method.

BACKGROUND DISCUSSION

In automation technology, especially in process automation-technology, field devices are often applied, which for serve registering and/or influencing process variables. Serving for registering process variables are sensors, for example, in fill level measurement-devices, flow measuring devices, pressure- and temperature measuring devices, pH redox potential measuring devices, conductivity measuring devices, etc., for registering the corresponding process variables, fill level, flow, pressure, temperature, pH-value, redox-potential, and conductivity. Serving for influencing process variables are actuators, such as, for example, valves or pumps, via which the flow of a liquid in a pipeline section, or the fill level in a container, can be changed. Referred to as field devices are, in principle, all devices, which are applied near to the process and which deliver, or process, process relevant information. In connection with the invention, the terminology, field devices, thus also includes remote I/Os, radio adapters, and, generally, electronic components, which are arranged at the field level. A large number of such field devices are produced and sold by the firm, Endress+Hauser.

In the case of fill-level measuring devices, contactless measuring methods are advantageous, since they are robust and are characterized by low maintenance. A further advantage is their ability to measure the fill level continuously, thus with a virtually infinitely high resolution. Therefore, in the field of continuous fill level measurement, primarily radar-based measuring methods are applied. An established measuring principle, in such case, is the travel-time measuring principle, which is also known under the name, pulse radar. In such case, a radar signal pulse is transmitted toward the fill substance and the travel time until receipt of the echo signal measured. Such measuring principle enables pulse radar-based fill level measuring devices to be implemented without great effort as regards their electrical circuits. However, the resolution of this type of measuring device is limited. A reason for this is that the transmitted microwave signal pulses cannot be infinitesimally short. Thus, the accuracy of measurement of the travel time and, thus, of the fill level is reduced.

In the field of pulse radar, the most varied of approaches are used for overcoming these limitations. Many of the approaches aim to obtain additional phase information from the pulse, in order to be able to determine the travel time more exactly. Such an approach, in the case of which the phase information is statistically registered, in order to determine the exact point in time of the pulse maximum, is described in published International Application, WO2013/092099A1. Approaches, which go in this direction, require, however, a more complex evaluation circuit. In this way, the actual advantage of the pulse radar method, namely the opportunity for easy circuit implementation, is lost.

To the extent that a more complex circuit technology can be tolerated, advantageous for radar-based fill level measurement is the FMCW method, which, in principle, enables a higher resolution. The FMCW-based radar distance measuring method involves continuously transmitting a high-frequency microwave signal. In such case, the frequency of the signal lies in a fixed frequency band in the region of a standardized, fundamental frequency ($f_0$). According to standard, frequency bands in the 6 GHz-region, the 26 GHz-region, and the 79 GHz-region are used. Characteristic for the FMCW method is that the transmission frequency is not constant, but, instead, changes periodically within the frequency band. The change can, in such case, be linear and have a sawtooth or triangular shape, or a sine shape, depending on application.

As in the case of pulse radar, there is, also in the case of the FMCW-based fill-level measuring method, a special challenge that the measurement signal cannot be identified without there being some doubt as to the correctness of the identification, because of disturbance signals. Thus, defective measured values can be generated, based on which the functional ability of the fill-level measuring device is degraded. An essential cause, in such case, is the receipt of disturbance echo signals, which arise not on the surface of the fill substance, but, instead, by reflection of the transmitted signal on disturbing bodies, such as stirrers or other objects installed in the container.

Over the years, many technical approaches have been developed for identifying and filtering-out these types of disturbance echo signals. Thus, known from WO 2012/139852 A1 is a method for calibration of FMCW-based fill-level measuring devices, in the case of which an unequivocal calibration signal is generated by means of an oscillating reference reflector, which is positioned between measuring device and fill substance.

Besides disturbance echo signals, which arise by reflection of the transmitted signal, there are, however, also other types of disturbance signals, which directly affect the receiving electronics of the fill-level measuring device. One such type is externally penetrating, electromagnetic disturbance radiation. Another source of disturbance signals can be, however, defective high frequency components in the fill-level measuring device. This is especially relevant for safety, when, as a result, a presumably valid received signal is detected, so that an accordingly wrong fill level measured value is output.

Current safety specifications require that fill level measuring devices, in the case of presence of such an error, must recognize that they are functionally incapacitated. Such a specification is set forth in, among other locations, the standards, DIN EN 61511/61508, in which a "Safety Integrity Level" (SIL) to be maintained is defined.

SUMMARY OF THE INVENTION

An object of the invention, therefore, is to provide a method, with which the functional ability of FMCW-based fill-level measuring devices can be checked.

The invention achieves this object by a method for checking the functional ability of a radar-based fill-level measuring device, which serves for measuring the fill level (L) of a fill substance located in a container. The method includes, in such case, method steps as follows:

during measurement operation a first microwave signal ($S_1$) is produced by means of a first periodic electrical signal ($s_1$), wherein the first electrical signal ($s_1$) has an approximately constant first frequency change ($f'_1$) in the region of a fundamental frequency ($f_0$), the first microwave signal ($S_1$) is transmitted in the direction of the surface of the fill substance, a first echo signal ($E_1$), which is produced by reflection of the first microwave signal ($S_1$), is received and converted into a first electrical received signal ($e_1$), a first difference signal ($IF_1$) is produced by mixing the first received signal ($e_1$) with the first electrical signal ($s_1$), frequency ($f_1$) of the first difference signal ($IF_1$) is ascertained, fill level (L) is determined based on the frequency ($f_1$) of the first difference signal ($IF_1$).

For checking functional ability, supplementally, a second microwave signal ($S_2$) is produced by means of a second periodic electrical signal ($s_2$), wherein the second electrical signal ($s_2$) has, in the region of the fundamental frequency ($f_0$), a second approximately constant frequency change ($f'_2$), which differs from the first frequency change ($f'_1$), the second microwave signal ($S_2$) is transmitted in the direction of the surface of the fill substance, a second echo signal ($E_2$), which is produced by reflection of the second microwave signal ($S_2$), is received and converted into a second electrical received signal ($e_2$), a second difference signal ($IF_2$) is produced by mixing the second received signal ($e_2$) with the second electrical signal ($s_2$), frequency ($f_2$) of the second difference signal ($IF_2$) is ascertained, it is checked, whether the frequency ($f_2$) of the second difference signal ($IF_2$) agrees with a reference frequency ($f_p$), wherein the reference frequency ($f_p$) has a predetermined value in comparison with the frequency ($f_1$) of the first difference signal (IN, for the case, in which the frequency ($f_2$) of the second difference signal ($IF_2$) does not agree with the predetermined frequency ($f_p$), the measuring device is classified as functionally incapacitated.

With the method, it is thus checked, whether a second frequency change ($f'_2$) deviating from the first frequency change ($f'_1$) in a functioning fill-level measuring device effects a defined shifted frequency ($f_2$) of the second difference signal ($IF_2$). If this is not the case, then the processed received signal ($e_1$, $e_2$) has not been caused by an echo signal ($E_1$, $E_2$) and a functionally incapacitated field device is to be assumed. The calculation of the shift, which serves as reference frequency ($f_p$) for the checking, results from the mutually differing frequency changes ($f'_1$, $f'_2$):

$$f_p = \left(\frac{f'_2 * f_1}{f'_1}\right)$$

For the case, in which, in the checking of the functional ability, the frequency ($f_2$) of the second difference signal ($IF_2$) deviates unequivocally from the reference frequency ($f_p$), it is to the assumed therefrom that the fill-level measuring device is functionally incapacitated.

An advantageous form of embodiment provides that the checking of the functional ability is performed in predefined intervals during measurement operation. In this way, a regular checking of the functional ability is assured, wherein the interval-length can be selected in accordance with the required level of safety.

In a further form of the method, the first difference signal ($IF_1$) and/or the second difference signal ($IF_2$) are/is digitized by an analog/digital converter. In this way, a simplified further processing of the difference signals ($IF_1$, $IF_2$) can be performed on a digital basis.

A variant of the method provides that the frequency change ($f'_1$) of the first electrical signal ($s_1$) corresponds to an approximate integer multiple of the second frequency change ($f'_2$). This facilitates the calculation of the reference frequency, which is calculated based on the above mentioned formula.

In a preferred embodiment of the method, the frequency ($f_1$) of the first difference signal ($IF_1$) is ascertained by a Fourier transformation of the first difference signal ($IF_1$). Fourier transformations can be performed circuit-wise with acceptable effort. In such case, in principle, any form of Fourier transformation can be utilized, for example, a discrete Fourier transformation (DFT). An especially small calculative effort is provided, however, by a fast Fourier transformation (FFT).

Accordingly, it is also advantageous, when the frequency ($f_2$) of the second difference signal ($IF_2$) is ascertained by a Fourier transformation of the second difference signal ($IF_2$).

A preferred variant of the method provides that the frequency changes ($f'_1$, $f'_2$) are produced by sawtooth-shaped excitation of the electrical signals ($s_1$, $s_2$). In such case, the invention allows, in principle, that the frequency changes ($f'_1$, $f'_2$) can be both positive as well as also negative. Likewise, the electrical signals ($s_1$, $s_2$) can according to the invention have a periodicity deviating from one another. Moreover, according to the invention, either of the frequency changes ($f'_1$, $f'_2$) can have a greater value than the other frequency change ($f'_1$, $f'_2$).

Alternatively to the latter variant of the method, the frequency changes ($f'_1$, $f'_2$) can be produced by triangular excitation of the electrical signals ($s_1$, $s_2$). Also, in the case of this form of excitation, the invention offers the choice as to whether the electrical signals ($s_1$, $s_2$) have the same periodicity in the case of the triangular excitation, as long as the excitation lies in the region of the fundamental frequency $f_0$.

Moreover, the invention achieves the object by a fill-level measuring device for performing the method described in at least one of the preceding claims. For such purpose, the fill-level measuring device comprises components as follows:

A signal producing unit for producing the electrical signals ($s_1$, $s_2$), an antenna unit for transmitting the microwave signals ($S_1$, $S_2$) and/or for receiving the echo signals ($E_1$, $E_2$), a mixer for mixing the electrical signals ($s_1$, $s_2$, $e_1$, $e_2$), and an evaluating unit for determining the fill level (L) and/or for checking the functional ability of the fill-level measuring device.

The recited units can be embodied in different variants. In such case, it is also included that a plurality of the mentioned units can be implemented in a single component of the circuit.

A further form of embodiment provides that the evaluating unit includes a bandpass filter, which is transmissive for the frequencies ($f_1$, $f_2$) of the difference signals ($IF_1$, $IF_2$). In this way, possible side frequencies, which are not associated with the fill level (L), are suppressed, so that the ascertaining of the frequencies ($f_1$, $f_2$) of the difference signals ($IF_1$, $IF_2$) is simplified.

Correspondingly, in an advantageous embodiment of the fill-level measuring device, the evaluating unit includes an amplifier for amplifying the difference signals ($IF_1$, $IF_2$). Also, this embodiment effects, in the case of corresponding choice of the amplification factor, a simplified ascertaining of the frequencies ($f_1$, $f_2$) of the difference signals ($IF_1$, $IF_2$).

BRIEF DESCRIPTION OF THE DRAWINGS

The invention will now be explained based on the appended drawing, the figures of which show as follows.

DETAILED DISCUSSION IN CONJUNCTION WITH THE DRAWINGS

Figure 1:
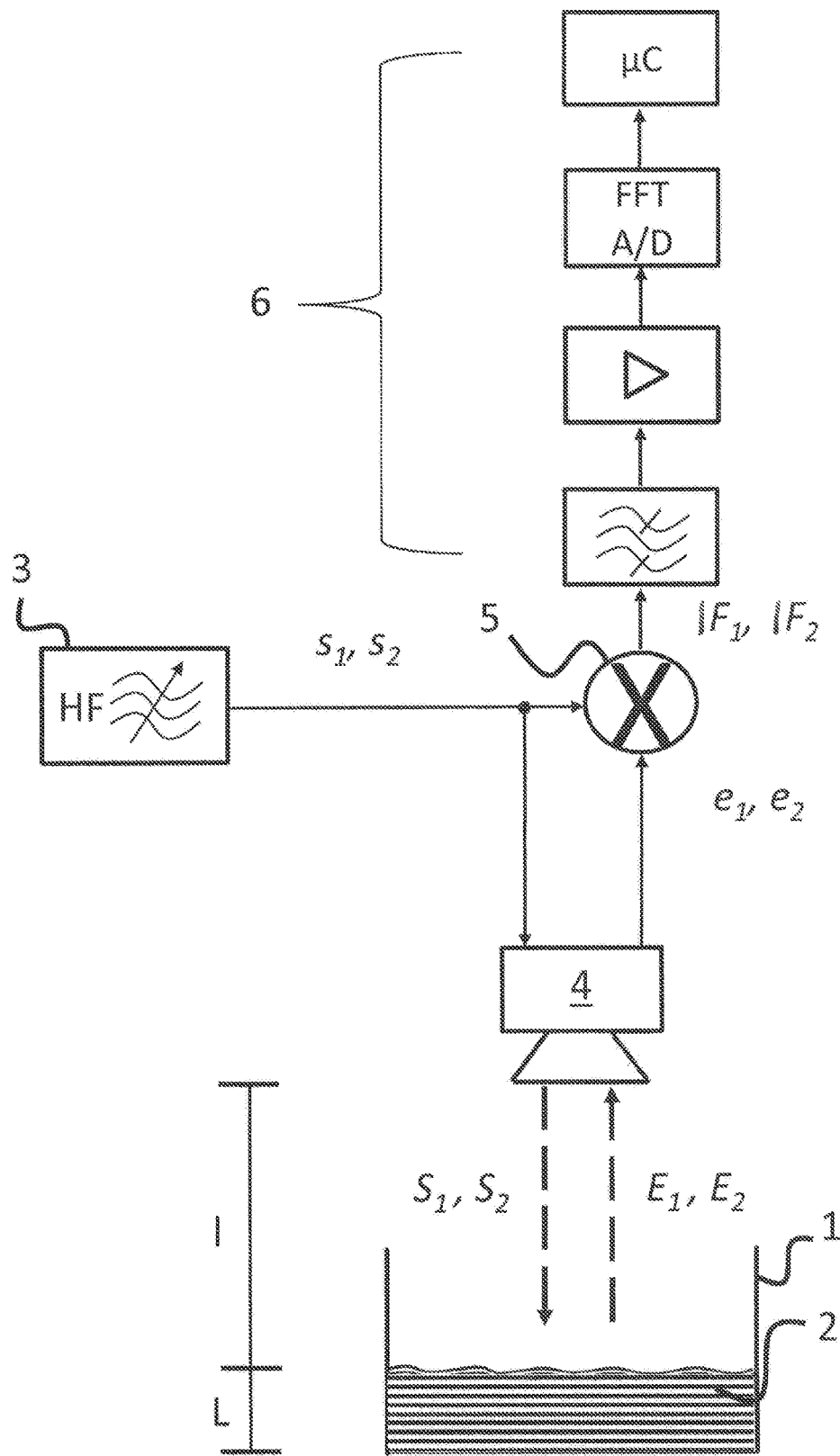
FIG. 1 is a fill-level measuring device for performing the method of the invention.

FIG. 1 shows a fill-level measuring device, which is suitable for embodiment of the method of the invention and accordingly is able to check the functional ability of the fill-level measuring device. The illustrated fill-level measuring device is based on a construction usual for FMCW-based fill level measuring devices. Responsible for producing the microwave signals $S_1$ and $S_2$ is a signal producing unit 3. As typical for FMCW, signal producing unit 3 produces electrical signals $s_1$ and $s_2$, which lie in the region of a fundamental frequency $f_0$ in the GHz-region and have constant frequency changes $f'_1$, $f'_2$. In measurement operation, the signal producing unit 3 produces exclusively a first electrical signal $s_1$ with a first constant frequency change $f'_1$. For checking the functional ability of the fill-level measuring device, instead of the first signal $s_1$, a second electrical signal $s_2$ is produced, which has a second frequency change $f'_2$ deviating from the first frequency change $f'_1$. In such case, it depends on the control of the signal producing unit 3, in which intervals the checking is performed.

The signal producing unit 3 can be, for example, a voltage controlled oscillator, which includes a suitable quartz crystal. According to the invention, the signal producing unit 3 produces signals $s_1$ and $s_2$ with differing frequency changes $f'_1$, $f'_2$. Possible characteristic forms of excitation, with which the signal producing unit 3 produces the electrical signals $s_1$ and $s_2$, are shown in FIG. 2a and FIG. 2b.

Figure 2A:
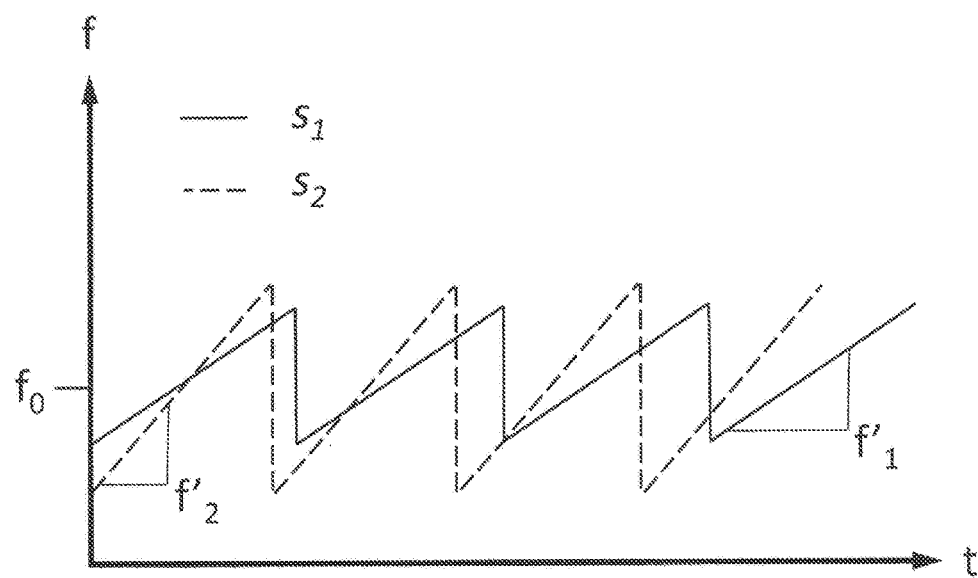
FIG. 2a is a sawtooth-shaped excitation of the electrical signals $s_1$ and $s_2$.

FIG. 2a shows a sawtooth-shaped excitation of the electrical signals $s_1$ and $s_2$. As shown, the sawtooth-shaped excitation of the frequency changes $f'_1$ and $f'_2$ is, on the one hand, linear, and, on the other hand, has a frequency increasing with time. A sawtooth-shaped excitation with frequency decreasing with time is, however, also implementable for the invention. The periodicities of the electrical signals $s_1$ and $s_2$ deviate slightly from one another in FIG. 2a. An agreement of the periodicities is not necessary according to the invention. Advantageously, however, the periodicities at least lie in the same order of magnitude.

Figure 2B:
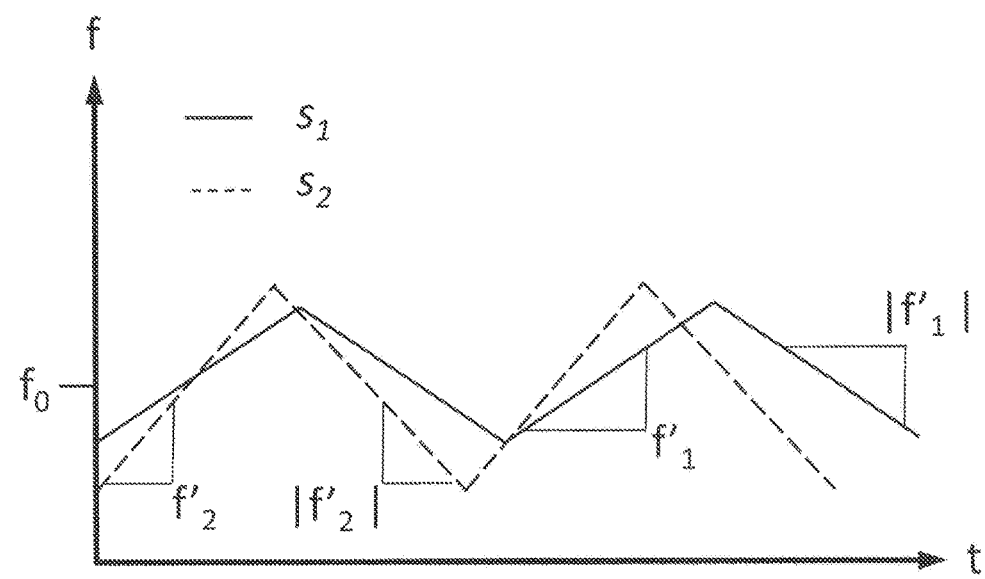
FIG. 2b is a triangular excitation of the electrical signals $s_1$ and $s_2$.

A possible alternative excitation form for the electrical signals $s_1$ and $s_2$ is shown in FIG. 2b. Here, the excitation occurs with triangular frequency changes $f'_1$ and $f'_2$. In such case, the magnitude $|f'_1|$ or $|f'_2|$ of the frequency change $f'_1$ or $f'_2$ in the part of the period, in which the frequency increases, and in the part of the period, in which the frequency decreases, are equal. Also, the triangular excitations of the electrical signals $s_1$ and $s_2$ shown in FIG. 2b do not have exactly equal periodicity. As in the case of the sawtooth shaped excitation, it is, however advantageous, also in the case of triangular excitation that the periodicities of the electrical signals $s_1$ and $s_2$ lie in the same order of magnitude or are even equal.

In the fill-level measuring device shown in FIG. 1, microwave signals $S_1$ and $S_2$ are produced in an antenna unit 4 by means of the electrical signals $s_1$ and $s_2$, wherein the microwave signals $S_1$ and $S_2$ are transmitted in the direction of a fill substance 2 located in a container 1. Corresponding to the electrical signals $s_1$ and $s_2$, also the microwave signals $S_1$ and $S_2$ have the frequency characteristics shown in FIG. 2a or FIG. 2b. FIG. 1 shows that the antenna unit 4, besides producing the microwave signals $S_1$ and $S_2$, also receives echo signals $E_1$ and $E_2$, which arise from reflection of the microwave signals $S_1$ and $S_2$ on the surface of the fill substance 2. Alternatively to the illustration, there could according to the invention also be a separate receiving antenna present.

The echo signals $E_1$ and $E_2$ are converted by the antenna unit 4 into electrical received signals $e_1$ and $e_2$. In measurement operation, then the received signal $e_1$ is mixed in a mixer 5 with the transmitted signal $s_1$. Likewise, in the case of checking the functional ability, the received signal $e_2$ is mixed with the transmitted signal $s_2$.

Difference signals $IF_1$ and $IF_2$, arise from the mixing of the received signal $e_1$ or $e_2$ with the transmitted signal $s_1$ or $s_2$, wherein the particular characteristic frequencies $f_1$, $f_2$ of the difference signals $IF_1$ and $IF_2$ result from the frequency difference between the instantaneous frequency of the transmitted signal $s_1$, or $s_2$, and the instantaneous frequency of the received signal $e_1$, or $e_2$.

For ascertaining the frequencies $f_1$, $f_2$ of the difference signals $IF_1$ and $IF_2$, the fill-level measuring device includes an evaluating unit 6. The ascertaining is performed, in such case, by fast Fourier transformation by a computing unit provided for such. As usual in the processing of such data, this happens based on digital data. Therefore, in the case of the evaluating unit 6 illustrated in FIG. 1, the fast Fourier transformation is placed after an analog/digital converter. Likewise, as usual in the case of FMCW-based fill-level measuring devices, the evaluating unit 6 includes a signal amplifier as well as a bandpass filter, wherein the bandpass filter is transmissive for the frequencies $f_1$ and $f_2$ of the difference signals $IF_1$ and $IF_2$. In this way, the frequencies $f_1$, $f_2$ stand out in the frequency spectrum obtained from the fast Fourier transformation as much as possible. From the frequency spectra obtained for the difference signals $IF_1$ and $IF_2$, it can be derived, whether the fill-level measuring device is functionally able.

Figure 3A:
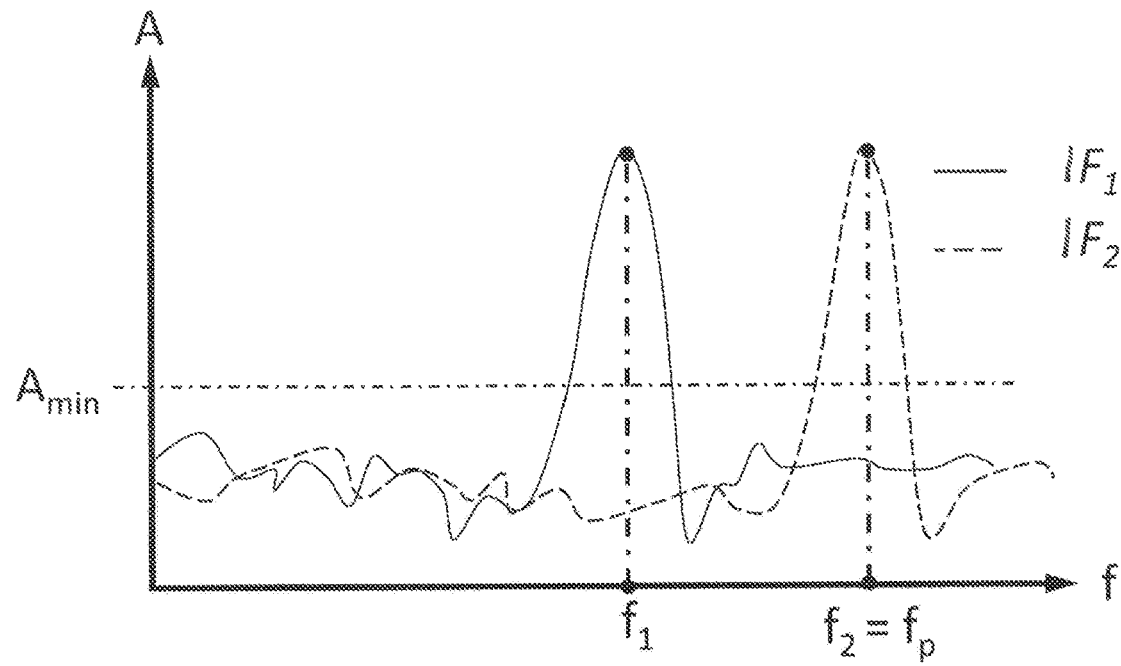
FIG. 3a is a frequency spectrum of the difference signals $IF_1$, and $IF_2$, in the case of which the frequency $f_2$ of the second difference signal $IF_2$ agrees with the reference frequency $f_p$.
Figure 3B:
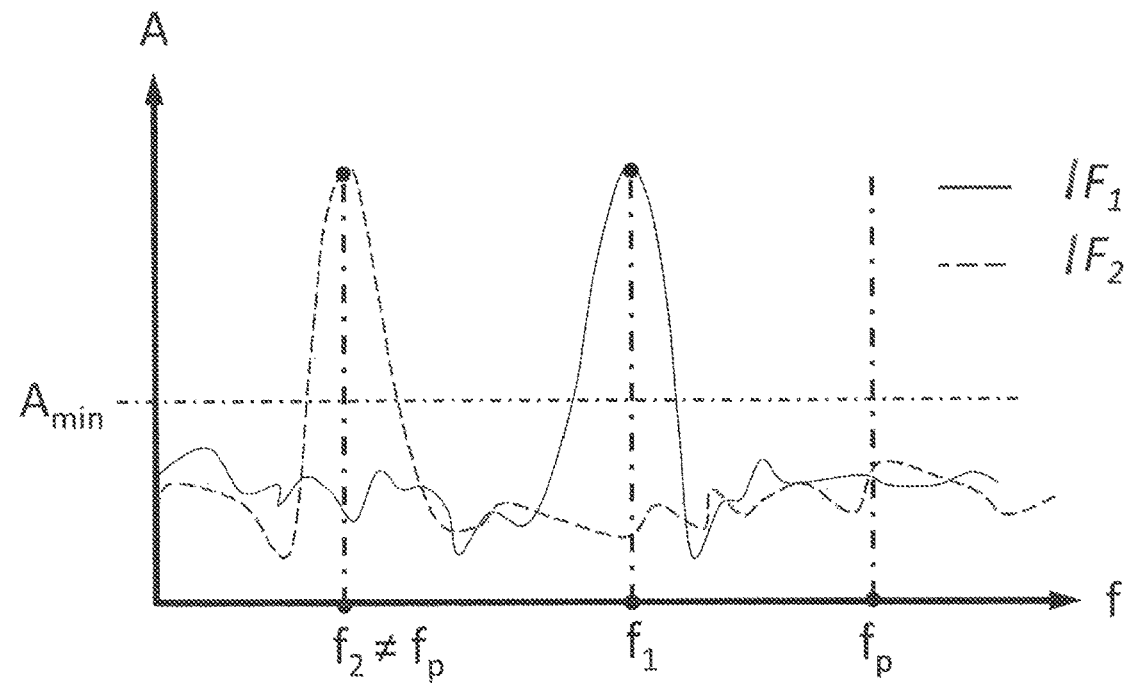
FIG. 3b is a frequency spectrum of the difference signals $IF_1$, and $IF_2$, in the case of which the frequency $f_2$ of the second difference signal $IF_2$ does not agree with the reference frequency $f_p$.

Two schematic frequency spectra, which result after performance of fast Fourier transformation, are shown in FIGS. 3a and 3b, wherein the fill-level measuring device is functionally incapacitated in the case of the frequency spectra illustrated in FIG. 3b.

In both figures (FIGS. 3a and 3b), the frequency spectra contain both a spectrum of the difference signal $IF_1$ obtained in the case of measurement operation, as well as also a spectrum of the difference signal $IF_2$ obtained while checking the functional ability. Each of the difference signals $IF_1$, $IF_2$ includes a characterizing maximum associated with the relevant difference frequency $f_1$, $f_2$. In the frequency spectra illustrated in FIG. 3a, the frequency $f_2$ of the difference signal $IF_2$ agrees with the reference frequency $f_p$, while this is not the case in FIG. 3b. From this, it is derived according to the invention that the fill-level measuring device is functionally incapacitated.

The determining of $f_1$ and $f_2$ based on the frequency spectra and the checking, whether the frequency $f_2$ agrees with the reference frequency $f_p$, are performed in the case of the fill-level measuring device shown in FIG. 1 by a microcontroller μC, wherein the microcontroller μC is a component of the evaluating unit 6. Thus, the fill-level measuring device can check for functional ability. As a result of this, it can be displayed, for example, on a display of the fill-level measuring device, when the device is functionally incapacitated, or this information can be transmitted to a superordinated unit, so that safety-critical fill levels in the container 1 caused by defective fill level measured values are avoided.

The invention claimed is:

1. A method for checking the functional ability of a FMCW-based fill-level measuring device, which serves for measuring fill level of a fill substance located in a container, wherein the method comprises the steps as follows during measurement operation:
   1) producing a first microwave signal by means of a first periodic electrical signal, wherein the first electrical signal has an approximately constant first frequency change solely across an entirety of a fixed frequency band, wherein the fixed frequency band is symmetrically positioned around a fundamental frequency;
   transmitting said first microwave signal in the direction of the surface of the fill substance;
   producing a first echo signal by reflection of said first microwave signal said first echo signal being received and converted into a first electrical received signal;
   producing a first difference signal by mixing said first received signal with said first electrical signal;
   ascertaining the frequency of said first difference signal;
   determining the fill level based on the frequency of said first difference signal, for checking the functional ability; and
   2) producing a second microwave signal by means of a second periodic electrical signal, wherein said second electrical signal has, in the fixed frequency band around the fundamental frequency, a second approximately constant frequency change across the entirety of the fixed frequency band, which differs from the first frequency change,
   transmitting said second microwave signal in the direction of the surface of the fill substance;
   receiving a second echo signal, which is produced by reflection of said second microwave signal and converted it into a second electrical received signal;
   producing a second difference signal by mixing said second received signal with said second electrical signal;
   ascertaining a frequency of said second difference signal;
   checking whether the frequency of said second difference signal agrees with a reference frequency, wherein the reference frequency has a predetermined value in comparison with the frequency of said first difference signal; and
   for the case, in which the frequency of said second difference signal does not agree with said predetermined frequency, the measuring device is classified as functionally incapacitated.

2. The method as claimed in claim 1, wherein:
   said checking of the functional ability is performed in predefined intervals during measurement operation.

3. The method as claimed in claim 1, wherein:
   the first difference signal and/or the second difference signal are/is digitized by an analog/digital converter.

4. The method as claimed in claim 1, wherein:
   the frequency change of the first electrical signal corresponds to an approximate integer multiple of the second frequency change.

5. The method as claimed in claim 1, wherein:
   the frequency of the first difference signal is ascertained by a Fourier transformation of the first difference signal.

6. The method as claimed in claim 1, wherein:
   the frequency of the second difference signal is ascertained by a Fourier transformation of the second difference signal.

7. The method as claimed in claim 1, wherein:
   the frequency changes are produced by sawtooth-shaped excitation of the electrical signals.

8. The method as claimed in claim 1, wherein:
   the frequency changes are produced by triangular excitation of the electrical signals.

9. A fill-level measuring device adapted to perform a method for checking the functional ability of a FMCW-based fill-level measuring device, which serves for measuring fill level of a fill substance located in a container, wherein the method comprises steps of:
   1) producing a first microwave signal by means of a first periodic electrical signal, wherein the first electrical signal has an approximately constant first frequency change solely across an entirety of a fixed frequency band, wherein the fixed frequency band is symmetrically positioned around a fundamental frequency;
   transmitting said first microwave signal in the direction of the surface of the fill substance; producing a first echo signal by reflection of said first microwave signal said first echo signal being received and converted into a first electrical received signal; producing a first difference signal by mixing said first received signal with said first electrical signal; ascertaining the frequency of said first difference signal;
   determining the fill level based on the frequency of said first difference signal, for checking the functional ability; and
   2) producing a second microwave signal by means of a second periodic electrical signal, wherein said second electrical signal has, in the fixed frequency band around the fundamental frequency, a second approximately constant frequency change across the entirety of the fixed frequency band, which differs from the first frequency change, transmitting said second microwave signal in the direction of the surface of the fill substance; receiving a second echo signal, which is produced by reflection of said second microwave signal and converted it into a second electrical received signal; producing a second difference signal by mixing said second received signal with said second electrical signal; ascertaining a frequency of said second difference signal; checking whether the frequency of said second difference signal agrees with a reference frequency, wherein the reference frequency has a predetermined value in comparison with the frequency of said first difference signal; and for the case, in which the frequency of said second difference signal does not agree with said predetermined frequency, the measuring device is classified as functionally incapacitated, wherein the fill-level measuring device comprises:
a signal producing unit for producing said electrical signals,
an antenna unit for transmitting said microwave signals and/or for receiving said echo signals;
a mixer for mixing said electrical signals; and
an evaluating unit for determining the fill level and/or for checking the functional ability of the fill-level measuring device.

10. The fill-level measuring device as claimed in claim 9, wherein:
said evaluating unit includes a bandpass filter, which is transmissive for the frequencies of the difference signals.

11. The fill-level measuring device as claimed in claim 9, wherein:
said evaluating unit includes an amplifier for amplifying the difference signals.

* * * * *